US012754669B2

(12) United States Patent
Zhao et al.

(10) Patent No.: US 12,754,669 B2
(45) Date of Patent: Oct. 6, 2026

(54) STORAGE SYSTEM, METHOD AND APPARATUS FOR PROCESSING DATA, NON-TRANSITORY STORAGE MEDIUM, AND ELECTRONIC DEVICE

(71) Applicant: SUZHOU METABRAIN INTELLIGENT TECHNOLOGY CO., LTD., Suzhou (CN)

(72) Inventors: Shuai Zhao, Suzhou (CN); Shihui Zhang, Suzhou (CN); Qinglin Liu, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/878,608

(22) PCT Filed: Aug. 23, 2023

(86) PCT No.: PCT/CN2023/114528

§ 371 (c)(1),
(2) Date: Dec. 23, 2024

(87) PCT Pub. No.: WO2024/113985

PCT Pub. Date: Jun. 6, 2024

(65) Prior Publication Data

US 2025/0390219 A1 Dec. 25, 2025

(30) Foreign Application Priority Data

Nov. 30, 2022 (CN) ......................... 202211519708.9

(51) Int. Cl.
*G06F 3/06* (2006.01)

(52) U.S. Cl.
CPC ............ *G06F 3/061* (2013.01); *G06F 3/0655* (2013.01); *G06F 3/0679* (2013.01)

(58) Field of Classification Search
CPC ............. G06F 13/4022; G06F 13/4221; G06F 13/0026; G06F 13/404; G06F 13/122;
(Continued)

(56) References Cited

U.S. PATENT DOCUMENTS 8,917,734 B1 * 12/2014 Brown .................... H04L 49/35
370/400
2016/0098372 A1 * 4/2016 Boyle ................. G06F 13/4282
710/313

(Continued)

FOREIGN PATENT DOCUMENTS

CN 101242371 A 8/2008
CN 104285218 A 1/2015

(Continued)

OTHER PUBLICATIONS

Jack Regula, "Using Non-transparent Bridging in PCI Express Systems", Jun. 1, 2004, PLX Technology, Inc., pp. 1-31 (Year: 2004).*

(Continued)

*Primary Examiner* — Curtis James Kortman
(74) *Attorney, Agent, or Firm* — Merchant & Gould P.C.

(57) ABSTRACT

Disclosed are a storage system, a method and apparatus for processing data, a non-transitory storage medium, and an electronic device. The system includes: a first storage domain (10) including a central processing unit, a first peripheral component interconnect express (PCIe) switch and a first port, where the first PCIe switch maps a PCIe request transmitted by the central processing unit from a first address space of the first port to a second address space of a second port; and a second storage domain (20) including a second PCIe switch, the second port and a plurality of first external storage devices, where the second PCIe switch is configured to map the PCIe request from the second address space to a first target external storage device, and the (Continued)

plurality of first external storage devices include the first target external storage device.

12 Claims, 3 Drawing Sheets

(58) Field of Classification Search
CPC ............... G06F 13/385; G06F 13/4282; G06F 2213/0026; G06F 2213/0012; G06F 3/061; G06F 3/0655; G06F 3/0679; G06F 3/06
See application file for complete search history.

(56) References Cited

U.S. PATENT DOCUMENTS

2016/0134564 A1* 5/2016 Egi ......................... H04L 45/24 370/401
2018/0059939 A1* 3/2018 He .......................... G06F 3/061
2018/0341619 A1* 11/2018 Slik ....................... G06F 3/0614
2019/0197000 A1* 6/2019 Kurokawa ............ G06F 3/0607
2019/0317894 A1 10/2019 Frolikov
2021/0200707 A1 7/2021 Vijayponraj
2022/0365899 A1* 11/2022 Wan .................... G06F 13/4295

FOREIGN PATENT DOCUMENTS

CN 113515478 A 10/2021
CN 114006875 A 2/2022
CN 114389995 A 4/2022
CN 114428757 A 5/2022
CN 114546913 A 5/2022
CN 115543894 A 12/2022

OTHER PUBLICATIONS

International Search Report for PCT/CN2023/114528 dated Nov. 15, 2023 (14 pages), with English translation of Search Report.
Chinese Search Report for CN Application No. 2022115197089, 1 pg.
Chinese Search Report for CN Application No. 2022115197089, 2 pgs.

* cited by examiner

STORAGE SYSTEM, METHOD AND APPARATUS FOR PROCESSING DATA, NON-TRANSITORY STORAGE MEDIUM, AND ELECTRONIC DEVICE

CROSS-REFERENCE TO RELATED APPLICATION

The present application is a National Stage Application of PCT International Application No.: PCT/CN2023/114528 filed on Aug. 23, 2023, which claims priority to Chinese Patent Application 202211519708.9, filed in the China National Intellectual Property Administration on Nov. 30, 2022, the disclosure of which is incorporated herein by reference in its entirety.

TECHNICAL FIELD

The disclosure relates to the technical field of hardware storage, and particularly relates to a storage system, a method and apparatus for processing data, a non-transitory storage medium, and an electronic device.

BACKGROUND

In a storage system, resources of a peripheral component interconnect express bus (PCIe BUS) in one controller are generally occupied by too many external storage devices such as a PCIe device of a central processing unit (CPU), an external interface card, and a non-transitory memory express (NVMe) or non-transitory memory host controller interface specification disk. Moreover, PCIe only includes 256 BUS numbers. If more external storage devices need to be connected to a controller, the resources of the PCIe BUS are seriously deficient.

In order to solve a problem that the resources of the PCIe BUS hardly satisfy demands of external storage devices, a way of expanding more NVMe disks with an NVMe to Ethernet chip and an Ethernet protocol has been developed in the related art. However, this way causes higher protocol conversion overhead and much higher complexity.

No effective solution has been put forward yet at present to solve the problems.

SUMMARY

One aspect of the embodiments of the disclosure provides a storage system. The system includes: a first storage domain including a central processing unit, a first PCIe switch and a first port, where the first PCIe switch maps a PCIe request transmitted by the central processing unit from a first address space of the first port to a second address space of a second port; and a second storage domain including a second PCIe switch, the second port and a plurality of first external storage devices, where the second PCIe switch is configured to map the PCIe request from the second address space to a first target external storage device, and the plurality of first external storage devices include the first target external storage device.

Alternatively, the first address space includes a plurality of first address fields. Each of the first address fields includes a plurality of second address fields. Each second address space includes a plurality of third address fields. All the third address fields are located in the second address space. There is a mapping relation between the third address fields and address fields of an external storage device. A preset number of third address fields are address fields of one external storage device.

Alternatively, the first port is a non-transparent bridge virtual port. The second address space is an address space of the non-transparent bridge virtual port.

Alternatively, the second port is a non-transparent bridge connection port. The second address space is an address space of the non-transparent bridge connection port.

Alternatively, the non-transparent bridge virtual port and the non-transparent bridge connection port are both arranged on the first PCIe switch.

Alternatively, address isolation exists between the first address space and the second address space.

Alternatively, the central processing unit maps the PCIe request from an address space of the central processing unit to the first address space of the first port.

Alternatively, a type of the first external storage device includes at least one of a PCIe device, an external interface card, and a solid state disk.

Alternatively, the storage system further includes: a third storage domain including a third PCIe switch, a third port, and a plurality of second external storage devices. The first PCIe switch further maps the PCIe request transmitted by the central processing unit from the first address space of the first port to a third address space of the third port. The third PCIe switch is configured to map the PCIe request from the third address space to a second target external storage device. The plurality of second external storage devices include the second target external storage device.

Alternatively, the second storage domain further includes a fifth port. The second PCIe switch is further configured to map the PCIe request from the second address space to an address space of the fifth port. The system further includes: a fourth storage domain including a fourth PCIe switch, a fourth port, and a plurality of third external storage devices. The fourth PCIe switch is configured to map the PCIe request from the address space of the fifth port to an address space of the fourth port, and to map the PCIe request from the address space of the fourth port to a third target external storage device. The plurality of third external storage devices include the third target external storage device.

One aspect of the embodiments of the disclosure provides a method for processing data. The method includes: receiving a PCIe request transmitted by a central processing unit by a first PCIe switch; mapping the PCIe request from a first address space of a first port to a second address space of a second port by the first PCIe switch; and mapping the PCIe request from the second address space to a target external storage device in a plurality of external storage devices connected to a second PCIe switch by the second PCIe switch.

Alternatively, the first address space includes a plurality of first address fields. Each of the first address fields includes a plurality of second address fields. Each second address space includes a plurality of third address fields. All the third address fields are located in the second address space. The mapping the PCIe request from a first address space of a first port to a second address space of a second port by the first PCIe switch includes: locating the PCIe request to a target second address field in the plurality of second address fields; and mapping the PCIe request from the target second address field to a target third address field in the plurality of third address fields according to a relation between the plurality of second address fields and the plurality of third address fields.

Alternatively, there is a mapping relation between the third address fields and address fields of an external storage device. The mapping the PCIe request from the second address space to a target external storage device in a plurality of external storage devices connected to a second PCIe switch by the first PCIe switch includes: mapping the PCIe request from a preset number of target third address fields to the target external storage device according to the mapping relation between the third address fields and the external storage devices.

Alternatively, in a case that the PCIe request is a reading request, after the mapping the PCIe request from the second address space to a target external storage device in a plurality of external storage devices connected to a second PCIe switch by the first PCIe switch, the method further includes: reading data indicated by the reading request from the target external storage device.

Alternatively, in a case that the PCIe request is a writing request, after the mapping the PCIe request from the second address space to a target external storage device in a plurality of external storage devices connected to a second PCIe switch by the first PCIe switch, the method further includes: writing data indicated by the writing request into the target external storage device.

Alternatively, before the receiving a PCIe request transmitted by a central processing unit by a first PCIe switch, the central processing unit maps the PCIe request from an address space of the central processing unit to the first address space of the first port.

Alternatively, the central processing unit, the first PCIe switch and the first port constitute a first storage domain. The second PCIe switch, the second port and the plurality of external storage devices constitute a second storage domain. Mapping the PCIe request from the first address space of the first port to the second address space of the second port means converting the PCIe request from the first storage domain to the second storage domain.

Another aspect of the embodiments of the disclosure further provides an apparatus for processing data. The apparatus includes: a first reception unit configured to receive a PCIe request transmitted by a central processing unit by a first PCIe switch, and map the PCIe request from a first address space of a first port to a second address space of a second port by the first PCIe switch; a first mapping unit configured to map the PCIe request from the first address space of the first port to the second address space of the second port by the first PCIe switch; and a second mapping unit configured to map the PCIe request from the second address space to a target external storage device in a plurality of external storage devices connected to a second PCIe switch by the second PCIe switch.

Yet another aspect of the embodiments of the disclosure further provides a non-transitory storage medium. The non-transitory storage medium includes a stored computer program. The computer program controls, at runtime, a device in which the non-transitory storage medium is located to execute the method for processing data.

Still another aspect of the embodiments of the disclosure further provides an electronic device. The electronic device includes one or more processors and a memory. The memory is configured to store one or more programs. When the one or more programs are executed by the one or more processors, the one or more processors are caused to implement the method for processing data.

BRIEF DESCRIPTION OF THE DRAWINGS

The accompanying drawings described herein are used to provide understanding of embodiments of the disclosure as part of the disclosure, and illustrative embodiments of the disclosure and their description are used to explain the disclosure and are not to be construed as unduly limiting the disclosure. In the drawings.

DETAILED DESCRIPTION

Figure 1:
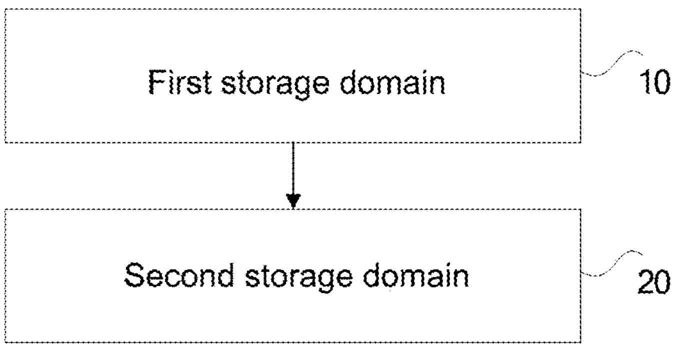
FIG. 1 is a schematic diagram of a storage system according to an embodiment of the disclosure.

In order to make those skilled in the art better understand a solution of the disclosure, technical solutions of embodiments of the disclosure will be described below clearly and completely in conjunction with accompanying drawings of the embodiments of the disclosure. Obviously, the embodiments described are merely some embodiments rather than all embodiments of the disclosure. On the basis of the embodiments of the disclosure, all other embodiments obtained by those of ordinary skill in the art without making creative efforts should fall within the protection scope of the embodiments of the disclosure.

It should be noted that the terms "first", "second", etc. in the description and claims of the embodiments of the disclosure and the above accompanying drawings are used to distinguish similar objects, instead of describing a specific sequence or a precedence order. It should be understood that data used in this way may be interchanged where appropriate, so that the embodiments of the disclosure described herein may be implemented in other sequences than those illustrated or described herein. Moreover, the terms "include" or "comprise" and "have" as well as their any variations are intended to cover non-exclusive inclusion, for instance, a process, a method, a system, a product or a device including a series of steps or units does not need to be limited by those explicitly listed, but may include other steps or units not explicitly listed or inherent to these processes, methods, products or devices.

In order to make those skilled in the art conveniently understand the embodiments of the disclosure, some of terms or nouns referred to in all the embodiments of the disclosure will be explained as follows:

Non-Transparent Bridge (NTB) is a type of non-transparent bridge technology.

Peripheral Component Interconnect Express (PCIe) BUS is a high-speed serial computer expansion bus specification.

Non Volatile Memory express (NVMe) is a non-transitory memory host controller interface specification.

It should be noted that related information (including, but not limited to, user device information, user personal information, etc.) and data (including, but not limited to, data for display, data for analysis, etc.) involved in the disclosure are all information and data permitted by a user or fully permitted by all parties. For instance, an interface is arranged between the system and a related user or institution. Before related information is obtained, an obtainment request needs to be transmitted to the user or institution by the interface.

In addition, the related information is obtained after approval information fed back by the user or institution is received.

The embodiments of the disclosure may be applied to various hardware storage systems/applications/devices.

The embodiments of the disclosure will be described in detail below in conjunction with all the embodiments.

An embodiment of the disclosure provides an embodiment of a storage system. It should be noted that steps illustrated in flow diagrams of the accompanying drawings may be executed in a computer system such as a set of computer-executable instructions, and although a logical order is illustrated in the flow diagrams, in some cases, the steps shown or described may be executed in an order different from that herein.

FIG. 1 is a schematic diagram of a storage system according to an embodiment of the disclosure. As shown in FIG. 1, the system includes the following steps:

a first storage domain 10 including a central processing unit, a first PCIe switch and a first port, where the first PCIe switch maps a PCIe request transmitted by the central processing unit from a first address space of the first port to a second address space of a second port.

Alternatively, in the storage system provided by the embodiment of the disclosure, the central processing unit maps the PCIe request from an address space of the central processing unit to the first address space of the first port, and then the first PCIe switch maps the PCIe request transmitted by the central processing unit from the first address space of the first port to the second address space of the second port.

Alternatively, the central processing unit maps the PCIe request from the address space to the first address space of the first port, and then the first PCIe switch maps the PCIe request in the first address space of the first port to the second address space of the second port.

Alternatively, in the storage system provided by the embodiment of the disclosure, the first port is a non-transparent bridge virtual port, and the first address space is an address space of the non-transparent bridge virtual port. The second port is a non-transparent bridge connection port. The second address space is an address space of the non-transparent bridge connection port. Address isolation exists between the first address space and the second address space.

Alternatively, the non-transparent bridge virtual port is a non-transparent (NT) virtual port, and the first address space is a plurality of base address register (BAR) address fields included in the NT virtual port. The non-transparent bridge connection port is an NT link port, and the second address space is a plurality of BAR address fields included in the NT link port.

Figure 2:
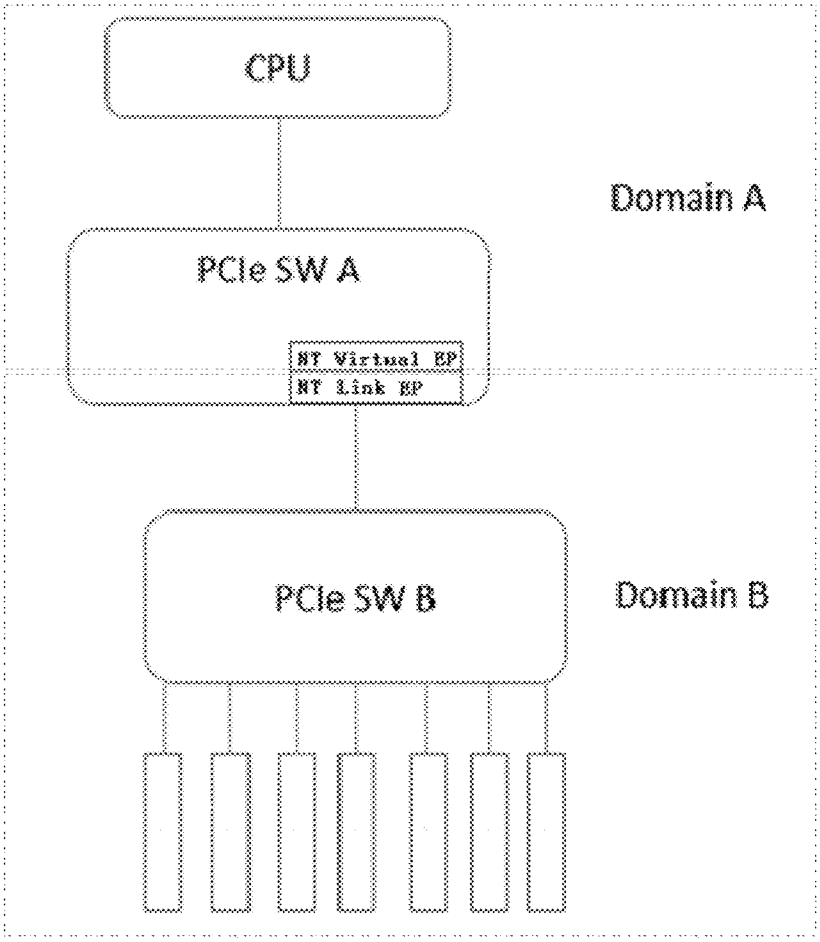
FIG. 2 is a schematic diagram of a structure of an alternative storage system according to an embodiment of the disclosure.

Alternatively, FIG. 2 is a schematic diagram of a structure of an alternative storage system according to an embodiment of the disclosure. As shown in FIG. 2, a first storage domain 10 may be a controller domain A, a central processing unit is CPU, and a first PCIe switch is a PCIe switch A. A first port is an NT virtual port in the controller domain A. A first address space may be a BAR address field included in the NT virtual port. The controller domain A includes the PCIe switch A, the CPU, and the NT virtual port. A second port is an NT link port. A second address space may be a BAR address field included in the NT link port.

A second storage domain 20 includes a second PCIe switch, the second port and a plurality of first external storage devices. The second PCIe switch is configured to map a PCIe request from a second address space to a first target external storage device. The plurality of first external storage devices include the first target external storage device.

Alternatively, as shown in FIG. 2, the second storage domain 20 may be a controller domain B, the second PCIe switch is a PCIe switch B, and the second port is an NT link port of the controller domain B. The controller domain B includes the PCIe switch B, the NT link port, and a plurality of external storage devices. Alternatively, the PCIe switch B converts an address of the PCIe request transmitted by the CPU to an address of a corresponding first external storage device such as an NVMe solid state disk through the second address space under the NT link port of the controller domain B.

Alternatively, in the storage system provided by the embodiment of the disclosure, a type of the first external storage device includes at least one of a PCIe device, an external interface card, and a solid state disk.

Alternatively, in the storage system provided by the embodiment of the disclosure, a non-transparent bridge virtual port and a non-transparent bridge connection port are both arranged on the first PCIe switch.

Alternatively, as shown in FIG. 2, the non-transparent bridge virtual port is the first port, that is, the NT virtual port. The non-transparent bridge connection port is the second port, that is, the NT link port. A function of the NT virtual port is to convert an address of a CPU side to an address of a link side. A function of the NT link port is to convert an address of a link side to an address of a corresponding hard disk. The PCIe switch A is connected to the NT virtual port. The PCIe switch B is connected to the NT link port. A non-transparent bridge is NTB. The PCIe switch is divided into several separate virtual switch parts. One non-transparent bridge may be established between two systems directly through PCIe, so as to implement cross-system communication and address conversion.

It should be noted that the peripheral component interconnect express (PCIe) is a general computer expansion bus standard. A PCIe BUS is a computer expansion bus, and is mainly configured to expand data throughput of a computer system bus and improve a device communication speed. Transmission is conducted in a point-to-point serial mode, which greatly increases a transmission rate. However, in the related art, the PCIe BUS is limited by 256 BUS numbers, and the controller may hardly be expanded and connected to the plurality of external storage devices.

In the embodiment, the plurality of external storage devices may be flexibly expanded through address mapping. The address mapping indicates converting a requested logical address to a physical address directly located by a machine at runtime. Alternatively, as shown in FIG. 2, according to a PCIe protocol, the PCIe switch A converts an address of the PCIe request, which may be a reading or writing request, transmitted by the CPU to an address of the second address space included in the NT link port in the controller domain B through the first address space included in the NT virtual port in the controller domain A. The address of the second address space corresponds to the plurality of external storage devices. Thus, data reading and writing of the external storage devices by the CPU are implemented.

The storage system of the embodiment of the disclosure includes the first storage domain 10 including the central processing unit, the first PCIe switch and the first port, where the first PCIe switch maps the PCIe request transmitted by the central processing unit from the first address space of the first port to the second address space of the second port; and the second storage domain 20 including the second PCIe switch, the second port and the plurality of first external storage devices, where the second PCIe switch is configured to map the PCIe request from the second address space to the first target external storage device, and the plurality of first external storage devices include the first target external storage device. A plurality of storage domains are set, and address conversion is conducted on the PCIe request between second ports of the different storage domains, such that a technical problem that higher protocol conversion overhead is required for a mode of expanding PCIe resources in the related art is solved. Further, the controller may support more external storage devices without increasing protocol conversion overhead.

Alternatively, in the storage system provided by the embodiment of the disclosure, the first address space includes a plurality of first address fields. Each of the first address fields includes a plurality of second address fields. Each second address space includes a plurality of third address fields. All the third address fields are located in the second address space. There is a mapping relation between the third address fields and address fields of an external storage device. A preset number of third address fields are address fields of one external storage device.

Figure 3:
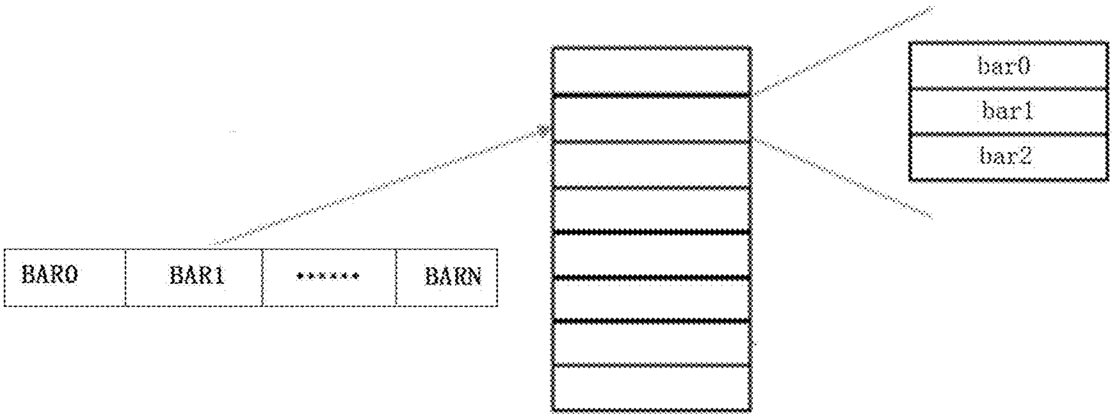
FIG. 3 is a schematic mapping diagram of an address space of an alternative storage system according to an embodiment of the disclosure.

Alternatively, FIG. 3 is a schematic mapping diagram of an address space of an alternative storage system according to an embodiment of the disclosure. As shown in FIG. 3, a first address space is an address space included in an NT virtual port, and first address fields are a plurality of BAR address fields, including BARO to BARN, in the first address space included in the NT virtual port. Each of the first address fields includes a plurality of second address fields. Each second address space includes a plurality of third address fields. All the third address fields constitute the second address space. A preset number of third address fields constitute address fields of external storage devices respectively. For instance, bar0, bar1 and bar2 constitute an address field of one external storage device.

A structure of the storage system may further be expanded transversely. Alternatively, in the storage system provided by the embodiment of the disclosure, the storage system further includes: a third storage domain including a third PCIe switch, a third port, and a plurality of second external storage devices. The first PCIe switch further maps a PCIe request transmitted by a central processing unit from the first address space of a first port to a third address space of the third port. The third PCIe switch is configured to map the PCIe request from the third address space to a second target external storage device. The plurality of second external storage devices include the second target external storage device.

Alternatively, the third storage domain may be a controller domain C. The controller domain C has a parallel relation with a controller domain B and is connected to a controller domain A. The third PCIe switch may be a PCIe switch C. The third port may be an NT virtual port included in the PCIe switch C. The second external storage devices may include a PCIe device, an external interface card, a solid state disk, and other devices. The controller domain C includes the PCIe switch C, an NT port, and the plurality of second external storage devices.

A PCIe switch A converts an address of the PCIe request transmitted by the CPU to an address of a third address space included in an NT link port of the controller domain C through the first address space included in an NT virtual port in the controller domain A. The PCIe switch C converts an address of the PCIe request in the third address space included in the NT link port in the domain C to an address of a corresponding second external storage device such as an NVMe solid state disk through the third address space under the NT link port.

A structure of the storage system may further be expanded longitudinally. Alternatively, in the storage system provided by the embodiment of the disclosure, the second storage domain 20 further includes a fifth port. The second PCIe switch is further configured to map the PCIe request from the second address space to an address space of the fifth port. The system further includes: a fourth storage domain including a fourth PCIe switch, a fourth port, and a plurality of third external storage devices. The fourth PCIe switch is configured to map the PCIe request from the address space of the fifth port to an address space of the fourth port, and to map the PCIe request from the address space of the fourth port to a third target external storage device. The plurality of third external storage devices include the third target external storage device.

Alternatively, a PCIe switch B includes the fifth port. The PCIe switch B converts an address of the PCIe request transmitted by the CPU to an address under the fifth port through a fifth address space under the NT link port of the controller domain B. The fourth storage domain may be a controller domain D. The controller domain D has a serial relation with the controller domain B and is connected to the controller domain B. The fourth PCIe switch may be a PCIe switch D. The fourth port may be an NT link port included in the PCIe switch D. The third external storage devices may include a PCIe device, an external interface card, a solid state disk, and other devices. The PCIe switch D converts an address of the PCIe request in the fifth port to an address of the fourth space address included in the NT link port of the controller domain D through the fifth address space under the NT link port in the controller domain D, and converts the address of the PCIe request to an address of a corresponding third external storage device such as an NVMe solid state disk through the fourth address space under the NT link port.

Figure 4:
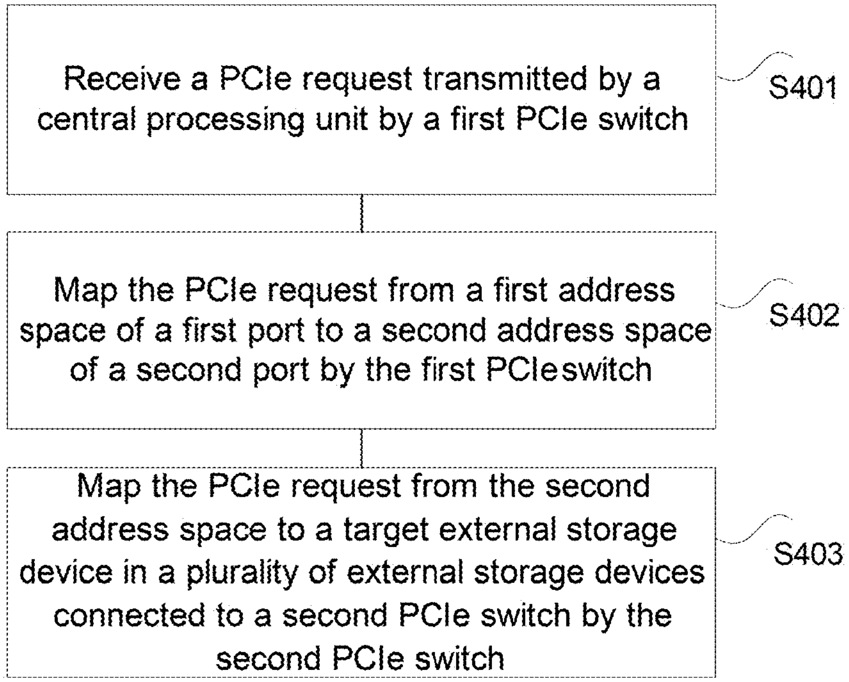
FIG. 4 is a schematic diagram of a method for processing data according to an embodiment of the disclosure.

FIG. 4 is a schematic diagram of a method for processing data according to an embodiment of the disclosure. The method is applied to a storage system of an alternative embodiment. As shown in FIG. 4, the method includes the following steps:

S401, a PCIe request transmitted by a central processing unit is received by a first PCIe switch.

Alternatively, FIG. 2 is a schematic diagram of a structure of an alternative storage system according to an embodiment of the disclosure. As shown in FIG. 2, the central processing unit is CPU, the first PCIe switch is a PCIe switch A, and the PCIe request may be a reading or writing request.

S402, the PCIe request is mapped from a first address space of a first port to a second address space of a second port by the first PCIe switch.

Alternatively, in the method for processing data according to the embodiment of the disclosure, before the PCIe request transmitted by the central processing unit is received by the first PCIe switch, the central processing unit maps the PCIe request from an address space of the central processing unit to the first address space of the first port.

Alternatively, the central processing unit maps the PCIe request from the address space to the first address space of the first port, and then the first PCIe switch maps the PCIe request in the first address space of the first port to the second address space of the second port.

Alternatively, in the method for processing data according to the embodiment of the disclosure, the central processing unit, the first PCIe switch and the first port constitute a first storage domain. The second PCIe switch, the second port and a plurality of external storage devices constitute a second storage domain. The PCIe request is mapped from the first address space of the first port to the second address space of the second port as follows: the PCIe request is converted from the first storage domain to the second storage domain.

As shown in FIG. 2, domain A is a first address domain, domain B is a second address domain, and the first PCIe switch is a PCIe switch A in a controller domain A. The first port is an NT virtual port in the controller domain A. A first address space may be a BAR address field included in the NT virtual port. A second port is an NT link port in a controller domain B. The second address space may be a BAR address field included in the NT link port. The PCIe request is mapped from the BAR address field of the NT virtual port to the BAR address field of the NT link port by the PCIe switch A. That is, the PCIe request may be converted from the first address domain to the second address domain.

S403, the PCIe request is mapped from the second address space to a target external storage device in a plurality of external storage devices connected to a second PCIe switch by the second PCIe switch.

As shown in FIG. 2, the second PCIe switch is a PCIe switch B in a controller domain B, and the plurality of external storage devices may be PCIe devices, external interface cards, solid state disks, etc.

Alternatively, the PCIe request transmitted by the CPU is received by the PCIe switch A. The PCIe switch A converts an address of the PCIe request to an address of a second address space included in an NT link port of the controller domain B through the first address space included in an NT virtual port in the controller domain A. Alternatively, the PCIe switch B converts an address of the PCIe request in the second address space included in the NT link port in the domain B to an address of a corresponding external storage device such as an NVMe solid state disk through the second address space under the NT link port.

In the method for processing data according to the embodiment of the disclosure, the PCIe request transmitted by the central processing unit is received by the first PCIe switch; the PCIe request is mapped from the first address space of the first port to the second address space of the second port by the first PCIe switch; and the PCIe request is mapped from the second address space to the target external storage device in the plurality of external storage devices connected to the second PCIe switch by the second PCIe switch. A plurality of storage domains are arranged, and address conversion is conducted on the PCIe request between second ports of the different storage domains, such that a technical problem that higher protocol conversion overhead is required for a mode of expanding PCIe resources in the related art is solved. Further, the controller may support more external storage devices without increasing protocol conversion overhead.

The embodiments of the disclosure will be described in detail with reference to all the steps mentioned above.

Alternatively, in the method for processing data according to the embodiment of the disclosure, the first address space includes a plurality of first address fields. Each of the first address fields includes a plurality of second address fields. Each second address space includes a plurality of third address fields. All the third address fields are located in the second address space. The step that the PCIe request is mapped from the first address space of the first port to the second address space of the second port by the first PCIe switch includes the following steps: the PCIe request is located to a target second address field in the plurality of second address fields; and the PCIe request is mapped from the target second address field to a target third address field in the plurality of third address fields according to a relation between the plurality of second address fields and the plurality of third address fields.

As shown in FIG. 2, the first PCIe switch is a PCIe switch A in a controller domain A, and the first port is an NT virtual port in the controller domain A. As shown in FIG. 3, the first address space is an address space included in the NT virtual port, and the first address fields are a plurality of BAR address fields in the first address space included in the NT virtual port. Each of the first address fields includes the plurality of second address fields, including BARO to BARN. Each second address space includes the plurality of third address fields. All the third address fields constitute the second address space. A preset number of third address fields constitute address fields of external storage devices. For instance, bar0, bar1 and bar2 constitute an address field of one external storage device.

Alternatively, the PCIe request is located to a target address field of the second address fields in the NT link port of the controller domain B. In a case that there is a mapping relation between the second address fields and the third address fields, the request is converted from the target address field to the target third address field of the plurality of corresponding third address fields through the second address space.

Alternatively, in the method for processing data according to the embodiment of the disclosure, there is a mapping relation between the third address fields and address fields of an external storage device. The step that the PCIe request is mapped from the second address space to the target external storage device in the plurality of external storage devices connected to the second PCIe switch by the first PCIe switch includes the following step: the PCIe request is mapped from a preset number of target third address fields to the target external storage device according to the mapping relation between the third address fields and the external storage devices.

As shown in FIG. 2, the first PCIe switch is the PCIe switch A in the controller domain A, the first port is the NT virtual port in the controller domain A, the second PCIe switch is a PCIe switch B in the controller domain B, and the second port is the NT link port in the controller domain B. Alternatively, since a plurality of address fields in the third address fields have a mapping relation with addresses of the external storage devices, an address of the request is mapped from the second address space under the NT link port of the domain B to the third address fields by the PCIe switch A, and then the request may be mapped to the address fields of the target external storage device.

Alternatively, in the method for processing data according to the embodiment of the disclosure, in a case that the PCIe request is a reading request, after the PCIe request is mapped from the second address space to the target external storage device in the plurality of external storage devices connected to the second PCIe switch by the first PCIe switch, the method further includes the following step: data indicated by the reading request is read from the target external storage device.

Alternatively, the PCIe request may be a reading or writing request initiated by a configuration space of the CPU. In a case that the PCIe request is a reading request, an address of the reading request in the controller domain A is mapped from the second address space included in the first address space by the NT virtual port of the PCIe switch A. That is, a logical address of the reading request is converted to a physical address directly located by a machine at runtime, and some fields of the reading request are repackaged. In this way, an address in the PCIe switch A is replaced by an address of the target external storage device in the plurality of external storage devices connected to the PCIe switch B, such that the CPU may read data from the target external storage device.

Alternatively, in the method for processing data according to the embodiment of the disclosure, in a case that the PCIe request is a writing request, after the PCIe request is mapped from the second address space to the target external storage device in the plurality of external storage devices connected to the second PCIe switch by the first PCIe switch, the method further includes the following step: data indicated by the writing request is written into the target external storage device.

Alternatively, the PCIe request may be a reading or writing request initiated in a configuration space by the CPU. In a case that the PCIe request is a writing request, an address of the writing request in the controller domain A is mapped from the second address space included in the first address space by the NT virtual port of the PCIe switch A. That is, a logical address of the writing request is converted to a physical address directly located by a machine at runtime, and fields are repackaged. In this way, an address in the PCIe switch A is replaced by an address of the target external storage device in the plurality of external storage devices connected to the PCIe switch B, such that the CPU may write data into the target external storage device.

A storage apparatus provided in the embodiment includes a plurality of implementation units. Each of the implementation units corresponds to each of implementation steps in the above alternative embodiments.

Figure 5:
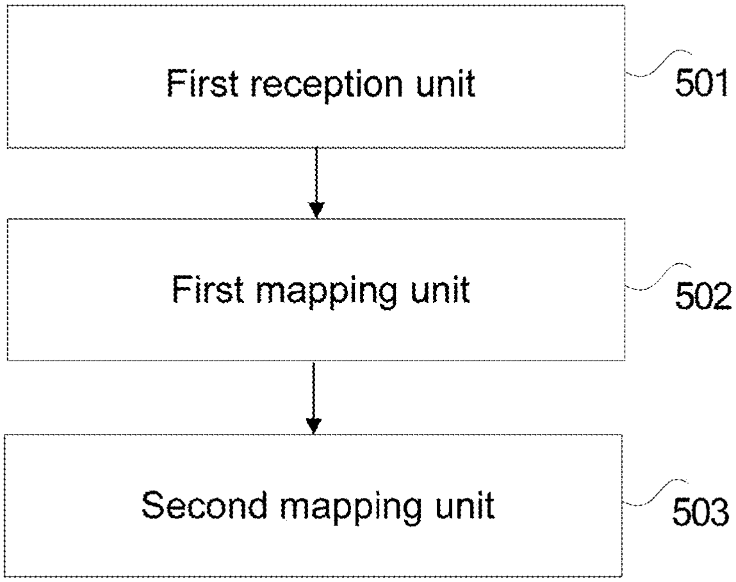
FIG. 5 is a schematic diagram of an apparatus for processing data according to an embodiment of the disclosure.

FIG. 5 is a schematic diagram of an apparatus for processing data according to an embodiment of the disclosure. As shown in FIG. 5, the apparatus may include: a first reception unit 501, a first mapping unit 502, and a second mapping unit 503.

Alternatively, the first reception unit 501 is configured to receive a PCIe request transmitted by a central processing unit by a first PCIe switch.

Alternatively, FIG. 2 is a schematic diagram of a structure of an alternative storage system according to an embodiment of the disclosure. As shown in FIG. 2, the central processing unit is CPU, the first PCIe switch is a PCIe switch A, and the PCIe request may be a reading or writing request.

The first mapping unit 502 is configured to map the PCIe request from a first address space of a first port to a second address space of a second port by the first PCIe switch.

Alternatively, the apparatus for processing data according to the embodiment of the disclosure further includes a third mapping unit. The third mapping unit is configured to map, before the PCIe request transmitted by the central processing unit is received by the first PCIe switch, the PCIe request from an address space of the central processing unit to the first address space of the first port by the central processing unit.

Alternatively, the central processing unit maps the PCIe request from the address space to the first address space of the first port, and then the first PCIe switch maps the PCIe request in the first address space of the first port to the second address space of the second port.

Alternatively, in the apparatus for processing data according to the embodiment of the disclosure, the central processing unit, the first PCIe switch and the first port constitute a first storage domain. The second PCIe switch, the second port and a plurality of external storage devices constitute a second storage domain. The PCIe request is mapped from the first address space of the first port to the second address space of the second port as follows: the PCIe request is converted from the first storage domain to the second storage domain.

As shown in FIG. 2, domain A is a first address domain, domain B is a second address domain, and the first PCIe switch is a PCIe switch A in a controller domain A. The first port is an NT virtual port in the controller domain A. A first address space may be a BAR address field included in the NT virtual port. The second port is an NT link port in a controller domain B. The second address space may be a BAR address field included in the NT link port. The PCIe request is mapped from the BAR address field of the NT virtual port to the BAR address field of the NT link port by the PCIe switch A.

The second mapping unit 503 is configured to map the PCIe request from the second address space to a target external storage device in a plurality of external storage devices connected to the second PCIe switch by the second PCIe switch.

As shown in FIG. 2, the second PCIe switch is a PCIe switch B in a controller domain B, and the plurality of external storage devices may be PCIe devices, external interface cards, solid state disks, etc.

Alternatively, the PCIe request transmitted by the CPU is received by the PCIe switch A. The PCIe switch A converts an address of the PCIe request to an address of a second address space included in an NT link port of the controller domain B through the first address space included in an NT virtual port in the controller domain A. Alternatively, the PCIe switch B converts an address of the PCIe request in the second address space included in the NT link port in the domain B to an address of a corresponding external storage device such as an NVMe solid state disk through the second address space under the NT link port.

The apparatus for processing data according to the embodiment of the disclosure includes the first reception unit 501 configured to receive the PCIe request transmitted by the central processing unit by the first PCIe switch; the first mapping unit 502 configured to map the PCIe request from the first address space of the first port to the second address space of the second port by the first PCIe switch; and the second mapping unit 503 configured to map the PCIe request from the second address space to the target external storage device in the plurality of external storage devices connected to the second PCIe switch by the second PCIe switch. A plurality of storage domains are arranged, and address conversion is conducted on the PCIe request between second ports of the different storage domains, such that a technical problem that higher protocol conversion overhead is required for a mode of expanding PCIe resources in the related art is solved. Further, the controller may support more external storage devices without increasing protocol conversion overhead.

Alternatively, in the apparatus for processing data according to the embodiment of the disclosure, the first address space includes a plurality of first address fields. Each of the first address fields includes a plurality of second address fields. Each second address space includes a plurality of third address fields. All the third address fields are located in the second address space. A first mapping unit 402 includes: a positioning module configured to locate the PCIe request to a target second address field in the plurality of second address fields; and a first mapping module configured to map the PCIe request from the target second address field to a target third address field in the plurality of third address fields according to a relation between the plurality of second address fields and the plurality of third address fields.

As shown in FIG. 2, the first PCIe switch is a PCIe switch A in a controller domain A, and the first port is an NT virtual port in the controller domain A. As shown in FIG. 3, the first address space is an address space included in the NT virtual port, and the first address fields are a plurality of BAR address fields in the first address space included in the NT virtual port. Each of the first address fields includes the plurality of second address fields, including BARO to BARN. Each second address space includes the plurality of third address fields. All the third address fields constitute the second address space. A preset number of third address fields constitute address fields of external storage devices. For instance, bar0, bar1 and bar2 constitute an address field of one external storage device.

Alternatively, the PCIe request is located to a target address field of the second address fields in the NT link port of the controller domain B. In a case that the second address fields have a mapping relation with the third address fields, the request is converted from the target address field to the target third address field of the plurality of corresponding third address fields through the second address space. Alternatively, in the apparatus for processing data according to the embodiment of the disclosure, the third address fields have a mapping relation with the address fields of the external storage devices. The second mapping unit 402 includes: a second mapping module configured to map the PCIe request from a preset number of target third address fields to the target external storage device according to the mapping relation between the third address fields and the external storage devices.

As shown in FIG. 2, the first PCIe switch is the PCIe switch A in the controller domain A, the first port is the NT virtual port in the controller domain A, the second PCIe switch is a PCIe switch B in the controller domain B, and the second port is the NT link port in the controller domain B. Alternatively, since a plurality of address fields in the third address fields have a mapping relation with addresses of the external storage devices, an address of the request is mapped from the second address space under the NT link port of the domain B to the third address fields by the PCIe switch A, and then the request may be mapped to the address fields of the target external storage device.

Alternatively, the apparatus for processing data according to the embodiment of the disclosure further includes: a reading unit configured to read, in a case that the PCIe request is a reading request, after the PCIe request is mapped from the second address space to the target external storage device in the plurality of external storage devices connected to the second PCIe switch by the first PCIe switch, data indicated by the reading request from the target external storage device.

Alternatively, the PCIe request may be a reading or writing request initiated by a configuration space of the CPU. In a case that the PCIe request is a reading request, an address of the reading request in the controller domain A is mapped from the second address space included in the first address space by the NT virtual port of the PCIe switch A. That is, a logical address of the reading request is converted to a physical address directly located by a machine at runtime, and some fields of the reading request are repackaged. In this way, an address in the PCIe switch A is replaced by an address of the target external storage device in the plurality of external storage devices connected to the PCIe switch B, such that the CPU may read data from the target external storage device.

Alternatively, the apparatus for processing data according to the embodiment of the disclosure further includes: a writing unit configured to write, in a case that the PCIe request is a writing request, after the PCIe request is mapped from the second address space to the target external storage device in the plurality of external storage devices connected to the second PCIe switch by the first PCIe switch, data indicated by the writing request into the target external storage device.

Alternatively, the PCIe request may be a reading or writing request initiated in a configuration space by the CPU. In a case that the PCIe request is a writing request, an address of the writing request in the controller domain A is mapped from the second address space included in the first address space by the NT virtual port of the PCIe switch A. That is, a logical address of the writing request is converted to a physical address directly located by a machine at runtime, and fields are repackaged. In this way, an address in the PCIe switch A is replaced by an address of the target external storage device in the plurality of external storage devices connected to the PCIe switch B, such that the CPU may write data into the target external storage device.

The apparatus for processing data may further include a processor and a memory. The first reception unit 501, the first mapping unit 502 and the second mapping unit 503, as program units, are all stored in the memory. The program units stored in the memory are executed by the processor so as to achieve corresponding functions.

The processor includes a core, and the core calls corresponding program units in the memory. One or more cores may be set, and a comparison result may be transmitted to a target terminal through adjustment of parameters of the cores.

The memory may include a volatile memory, a random access memory (RAM), and/or a non-transitory memory, such as a read-only memory (ROM) or a flash RAM, in a non-transitory storage medium, and the memory includes at least one memory chip.

Another aspect of the embodiments of the disclosure further provides a non-transitory storage medium. The non-transitory storage medium includes a stored computer program. The computer program controls, at runtime, a device in which the non-transitory storage medium is located to execute the method for processing data.

Yet another aspect of the embodiments of the disclosure further provides an electronic device. The electronic device includes one or more processors and a memory. The memory is configured to store one or more programs. When the one or more programs are executed by the one or more processors, the one or more processors are caused to implement the method for processing data.

The sequence numbers of the embodiments of the disclosure are only for description and do not indicate advantages and disadvantages of the embodiments.

In the embodiments of the disclosure, each of the embodiments is described with their own emphasis. Reference may be made to related description of other embodiments for the part not detailed in a certain embodiment.

In several embodiments provided by the disclosure, it should be understood that the disclosed technology may be implemented in other ways. The apparatus embodiments described above are merely illustrative. For instance, a division of the units may be a division of logical functions. In actual implementation, there may be additional ways of division. For instance, a plurality of units or components may be combined or integrated into another system, or some features may be ignored or not executed. Further, mutual coupling or direct coupling or communication connection shown or discussed may be indirect coupling or communication connection by some interfaces, units or modules, or may be in electrical or other forms.

The units illustrated as separate components may be physically separate or not, and the components shown as units may be physical units or not, that is, may be located in one place, or may also be distributed over a plurality of units. Some units or all the units may be selected according to actual needs, so as to achieve the objective of the solution of the embodiment.

In addition, each functional unit in each embodiment of the disclosure may be integrated in one processing unit, or each unit may exist separately and physically, or two or more units may be integrated into one unit. The integrated unit may be implemented in a form of hardware, or may be implemented in a form of a software functional unit.

If the integrated unit is implemented in the form of a software functional unit and sold or used as an independent product, the integrated unit may be stored in a non-transitory storage medium. Based on such understanding, a technical solution of the disclosure may be embodied in the form of software products in essence or in part that contributes to the prior art or in part or whole, the computer software products are stored in one non-transitory storage medium, and include several instructions to make one computer device (which may be a personal computer, a server, a network device, etc.) execute all or some steps of the method of each of the embodiments of the disclosure. The non-transitory storage medium includes: a USB flash disk, a read-only memory (ROM), a random access memory (RAM), a mobile hard disk, a magnetic disk, an optical disk and other non-transitory storage media capable of storing program codes.

What are described above are merely preferred embodiments of the disclosure. It should be noted that those of ordinary skill in the art may also make some improvements and modifications without departing from the principle of the disclosure, and these improvements and modifications should also fall within the protection scope of the disclosure.

The invention claimed is:

1. A storage system, comprising:

a first storage domain comprising a central processing unit, a first peripheral component interconnect express (PCIe) switch and a first port, wherein the first PCIe switch maps a PCIe request transmitted by the central processing unit from a first address space of the first port to a second address space of a second port; and a second storage domain comprising a second PCIe switch, the second port and a plurality of first external storage devices, wherein the second PCIe switch is configured to map the PCIe request from the second address space to a first target external storage device, and the plurality of first external storage devices comprise the first target external storage device;

wherein the first port is a non-transparent bridge virtual port, the second port is a non-transparent bridge connection port, and the non-transparent bridge virtual port and the non-transparent bridge connection port are both arranged on the first PCIe switch.

2. The storage system as claimed in claim 1, wherein the first address space comprises a plurality of first address fields, each of the first address fields comprises a plurality of second address fields, each second address space comprises a plurality of third address fields, all the third address fields are located in the second address space, and there is a mapping relation between the third address fields and address fields of an external storage device, wherein a preset number of third address fields are address fields of one external storage device.

3. The storage system as claimed in claim 1, wherein the first address space and the second address space are isolated in terms of addressing.

4. The storage system as claimed in claim 1, wherein the central processing unit is configured to map the PCIe request from an address space of the central processing unit to the first address space of the first port.

5. The storage system as claimed in claim 1, wherein a type of the first external storage device comprises at least one of a PCIe device, an external interface card, and a solid state disk.

6. A method for processing data, applied to a storage system, the storage system comprises: a first storage domain comprising a central processing unit, a first peripheral component interconnect express (PCIe) switch and a first port; and a second storage domain comprising a second PCIe switch, a second port and a plurality of first external storage devices, wherein the first port is a non-transparent bridge virtual port, the second port is a non-transparent bridge connection port, and the non-transparent bridge virtual port and the non-transparent bridge connection port are both arranged on the first PCIe switch, the method comprises:

receiving a PCIe request transmitted by the central processing unit by the first PCIe switch;

mapping the PCIe request from a first address space of the first port to a second address space of the second port by the first PCIe switch; and mapping the PCIe request from the second address space to a first target external storage device in the plurality of first external storage devices connected to a second PCIe switch by the second PCIe switch.

7. The method as claimed in claim 6, wherein the first address space comprises a plurality of first address fields, each of the first address fields comprises a plurality of second address fields, each second address space comprises a plurality of third address fields, all the third address fields are located in the second address space, and the mapping the PCIe request from the first address space of the first port to the second address space of the second port by the first PCIe switch comprises:

locating the PCIe request to a target second address field in the plurality of second address fields; and mapping the PCIe request from the target second address field to a target third address field in the plurality of third address fields according to a relation between the plurality of second address fields and the plurality of third address fields.

8. The method as claimed in claim 7, wherein there is a mapping relation between the third address fields and address fields of an external storage device, and the mapping the PCIe request from the second address space to the target external storage device in the plurality of external storage devices connected to the second PCIe switch by the first PCIe switch comprises:

mapping the PCIe request from a preset number of target third address fields to the target external storage device according to the mapping relation between the third address fields and the external storage devices.

9. The method as claimed in claim 6, wherein in a case that the PCIe request is a reading request, after the mapping the PCIe request from the second address space to the target external storage device in the plurality of external storage devices connected to the second PCIe switch by the first PCIe switch, the method further comprises:

reading data indicated by the reading request from the target external storage device.

10. The method as claimed in claim 6, wherein in a case that the PCIe request is a writing request, after the mapping the PCIe request from the second address space to the target external storage device in the plurality of external storage devices connected to the second PCIe switch by the first PCIe switch, the method further comprises:

writing data indicated by the writing request into the target external storage device.

11. The method as claimed in claim 6, wherein before the receiving the PCIe request transmitted by the central processing unit by the first PCIe switch, the central processing unit maps the PCIe request from an address space of the central processing unit to the first address space of the first port.

12. The method as claimed in claim 6, wherein the mapping the PCIe request from the first address space of the first port to the second address space of the second port comprises converting the PCIe request from the first storage domain to the second storage domain.

* * * * *